July 11, 1961  D. V. HUBBARD  2,991,969

GAGE AND DIAL INDICATOR MOUNT

Filed Dec. 22, 1958

INVENTOR.
DALE V. HUBBARD
BY
Oldham & Oldham
ATTYS.

United States Patent Office

2,991,969
Patented July 11, 1961

2,991,969
GAGE AND DIAL INDICATOR MOUNT
Dale V. Hubbard, 213 E. 5th St., Uhrichsville, Ohio
Filed Dec. 22, 1958, Ser. No. 782,099
4 Claims. (Cl. 248—278)

This invention relates to a mounting for dial indicators, gages, or the like, and especially relates to a particular mounting means for such instruments whereby an added plane of adjustment or movement is provided for the dial indicator so that a universal mounting or adjusting action is available for the instrument, such as the dial indicator thereon, at the instrument mounting means.

Heretofore there have been various types of dial indicators and gages manufactured and relatively standard mounting means have been provided therefor. These mounting means have permitted adjustment of the position of the dial indicator in a plane defined by a lug on the dial indicator, which lug is pivotally secured to an associated flat lug, or section on a mounting arm. While other adjustable support arms are provided in association with this primary mounting arm to permit further movement of the dial indicator and its associated means, it still has been very difficult, if not impossible in many instances to obtain satisfactory positioning of a gage, or dial indicator so that the instrument can be rapidly, accurately and conveniently read by a person using the gage. It also has been difficult to align the spindle of the instrument with the direction of movement of work to be measured.

It is well known that in the production gaging of various parts, or in other measuring actions by a variety of instruments, frequently it is very desirable that the dial indicator, or gage be positioned in an odd or unusual manner to provide a convenient and accessible reading dial, or face exposed to the person using the instrument. Hence, while previous dial indicators have been adjustable in a given plane, they have not been universally adjustable at the dial indicator and thus frequently it has been very difficult, if not impossible, to obtain a reading of the desired measurements.

The general object of the present invention is to provide a novel and improved type of dial indicator and especially the mounting means therefor characterized by the adjustment of the dial indicator in a plane parallel to the indicator face on such an instrument, while also permitting conventional movement in a plane perpendicular to such dial indicator face so that universal adjustment action of the dial indicator is provided.

Another object of the invention is to provide an attachment that can be readily and permanently secured to a dial indicator or the like to replace the original back thereon and to provide additional adjustment in the position of the dial indicator by such replacement back and associated means.

Another object of the invention is to provide a link intermediate a standard positioning arm or bracket for a dial indicator and the actual positioned dial indicator for additional adjustment in the operative position of the dial indicator.

Yet another object of the invention is to provide a relatively inexpensive, easily attached substitute backplate for a dial indicator so that the dial indicator can be moved about two or more axes.

The foregoing and other objects and advantages of the invention will be made more apparent as the specification proceeds.

Attention now is particularly directed to the accompanying drawings wherein one currently preferred embodiment of the invention is shown, and wherein:

FIG. 5 shows a modified type of mounting assembly for a dial indicator, or the like.

When referring to corresponding members shown in the drawings and referred to in the specification, corresponding numerals are used to facilitate comparison therebetween.

As previously stated, the mounting assembly of the invention is particularly adapted for positioning a dial indicator, or the like and the positioning means include a swivel cylinder having a threaded section on its periphery extending parallel to the axis of the cylinder and having a mounting lug extending from one end of the cylinder, the swivel cylinder also has a shoulder thereon facing the threaded section but intermediate such threaded section and the mounting lug, a back plate is provided for the case for the dial indicator and is adapted to be secured thereto, means secure the back plate to the case while other means secure the back plate pivotally to the swivel cylinder intermediate the threaded section and the other end of such cylinder, and a lock nut is provided that engages the threaded section on the swivel cylinder and is movable to force the back plate against the securing means therefor to lock such plate and any dial indicator case secured thereto in a given position, which lock nut also can be moved to a release position in which the dial indicator case and back plate therefor can be rotated on or about the swivel cylinder.

Figure 1:
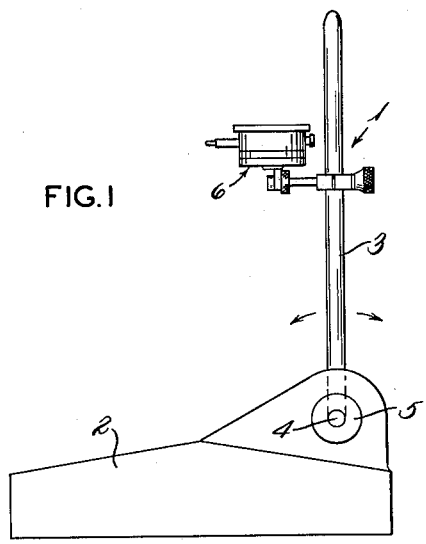
FIG. 1 is an elevation of a conventional dial indicator with a substantially conventional mounting means, or stand provided therefor.
Figure 2:
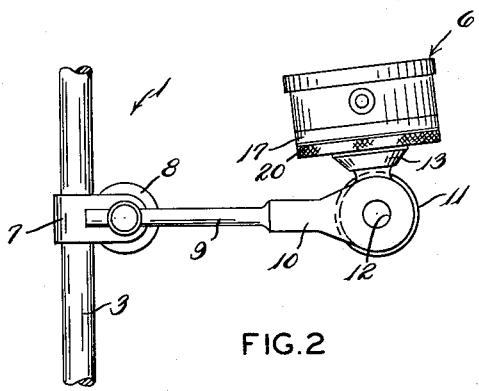
FIG. 2 is an enlarged fragmentary side view of the dial indicator showing a conventional mounting arm means positioning a dial indicator by a mounting assembly of the invention.
Figure 3:
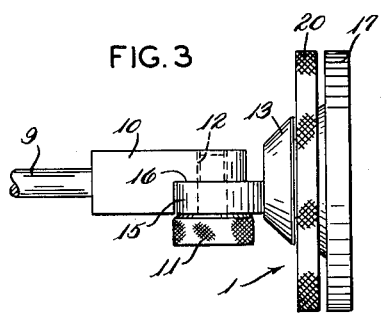
FIG. 3 is a plan of the dial indicator mounting assembly, embodying the principles of the invention, showing it attached to a standard mounting arm.
Figure 4:
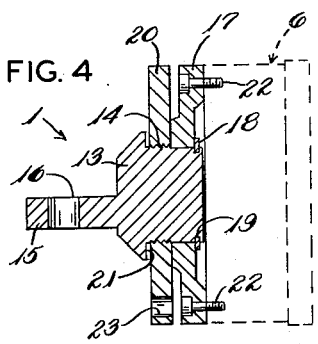
FIG. 4 is a longitudinal vertical section taken through the dial indicator mounting assembly of FIG. 3.

Particular attention now is directed to the details of the structure shown in the drawings, and a mounting assembly for a dial indicator, gage or other similar instrument is indicated as a whole by the numeral 1. Such mounting assembly, best shown in FIGS. 3 and 4, is carried by a conventional positioning block 2, as shown in FIG. 1, or equivalent support. The positioning block 2 has a support, or arm 3 usually extending substantially vertically therefrom and with the support 3 being pivotally secured to the positioning block 2 as by means of a threaded stud 4 that has a lock nut 5 provided thereon or is otherwise conventionally engaged with the block 2 to lock the support 3 in a given position with relation to the block 2. A dial indicator is indicated as a whole by the numeral 6 and the dial indicator 6 and its entire mounting assembly is movable longitudinally of the support 3 by means of a support bracket 7 that can be clamped in a given position on the support 3 by means of a lock nut 8, or equivalent conventional member. The bracket 7 also has a support rod 9 secured thereto and extending therefrom. The rod 9 has an L-shaped support member, or lug 10 secured to the free end thereof for engaging the mounting assembly 1 of the invention. The mounting assembly 1 is secured to the L-shaped member 10 by means of a lock nut, thumbscrew, or stud 11 that engages a tapped hole 12 in the member 10.

The mounting assembly 1 of the invention, as an important feature thereof, includes a swivel cylinder 13 that has a threaded section 14 thereon extending parallel to the longitudinal axis of the cylinder 13. A mounting lug 15 extends from one end of the swivel cylinder 13 and it has a flat surface 16 provided thereon adapted to bear against a corresponding flat surface provided on the L-shaped member 10 so that the swivel cylinder 13 is movable in a plane defined by such flat surface 16, when the lock stud 11 is loosened. A back, or cover plate, or end cap 17 is rotatably positioned on the swivel cylinder 13 intermediate the threaded section 14 thereof and the end of the swivel cylinder 13 opposite to that having the mounting lug 15 thereon. The back plate 17 is suitably secured to the swivel cylinder to be retained in engagement therewith, as by means of a lock washer 18 received in a recess 19 provided in the periphery of the swivel cylinder 13 adjacent the end thereof, as shown in FIG. 4.

As another important feature of the invention, the mounting assembly 1 includes a lock nut, or disc 20 in threaded engagement with the threaded section 14 on the swivel cylinder 13. A stop shoulder 21 is also formed on the swivel cylinder 13 adjacent the threaded section 14 and facing towards such threaded section. Such shoulder 21 forms a stop to limit rotary motion of the lock nut 20 in one direction on the threaded section of the swivel cylinder. However, the lock nut 20 can be turned to a different position away from the stop shoulder 21 at which time the lock nut will force the end cap or back plate 17 against the lock washer 18, or equivalent member provided in the invention assembly to lock such back plate or end cap in a fixed, or given position. However, at any time that the lock nut 20 releases the back plate 17, such back plate and any member secured thereto is free for rotary motion about the longitudinal axis of the swivel cylinder 13 so that a second adjusting action or movement is provided by the mounting assembly 1 and the dial indicator 6 positioned thereby.

Specifically, the dial indicator 6 is secured to the back plate 17 by means of a plurality of screws, or studs 22 which extend through suitable apertures formed in the back plate 17 and are seated in tapped sockets normally provided as a portion of the case for the dial indicator 6 for use in securing the original back plate of the dial indicator 6 thereto. FIG. 4 shows that a bore 23 is provided in the lock nut 20, which bore is of such size that the screws 22 can be inserted therethrough or removed from the back plate through such bore, as desired. The back plate 17 can be rotated when freely positioned on the swivel cylinder 13 so that the bore 23 can be brought into alignment with the different tapped sockets provided in the case of the dial indicator for receiving the screws 22. The screws 22 thus can be positioned through the bore 23.

In order to secure the mounting assembly 1 of the invention to a given dial indicator to position it, the original back plate on such dial indicator would be removed and discarded. Then the mounting assembly of the invention can be secured to the dial indicator by use of the same screws, usually, as are used on the instrument initially. In all events, after the dial indicator has been secured to the back plate 17, the entire assembly then can be supported on the conventional dial or gage positioning means including the L-shaped member 10. By this assembly, the dial indicator itself is positioned for arcuate movement in a plane parallel to the back plate 17, while also being positioned by the mounting lug 15 of the swivel cylinder for movement in a plane normal to such plane of the back plate 17 so that universal movement or adjustment of the dial indicator 6 is provided and the face thereof can be adjusted so as to permit convenient reading thereof even though the dial is positioned in a relatively inaccessible spot, or in an unusual manner for gaging or testing some dimension of a work piece.

Figure 5:
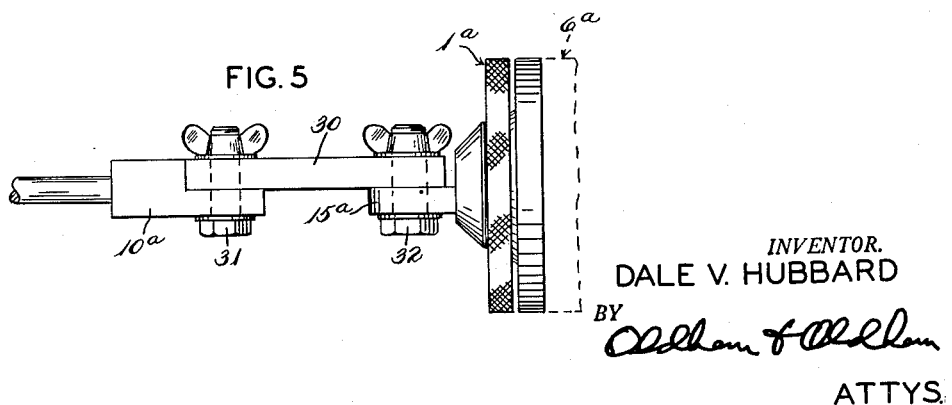

Even further adjustment in the positioning of a dial indicator 6a is shown by the apparatus shown in FIG. 5. In this instance, a mounting assembly 1a of the invention is used to secure the dial 6a to an L-shaped member 10a by means of a connector link 30. Such connector link 30 is secured to the L-shaped member 10a, as by means of a locking stud or screw 31 while a similar locking screw or stud 32 secures the opposite end of the link 30 to a mounting lug 15a provided on the mounting assembly 1a. Thus additional movement of the dial indicator 6a is permitted to adjust such member for convenient reading and gaging or indicating action.

It should be understood that any desired means can be provided on the swivel cylinder 13 to lock the back plate thereto, and that the shoulder 21 and lock washer 18 could be reversed, for example, in position to hold the lock nut and back plate in assembled relation. The lock nut 20 can be retained on the swivel cylinder by merely elongating the threaded section 14, or providing other means to hold the lock nut on the swivel cylinder.

Other means such as cam sections, spaced circumferentially of each other, may be formed on the adjacent surfaces of the shoulder 21 and the lock nut 20 to move the lock nut axially of the swivel cylinder to force the back plate 17 into a locked position when such cam sections are engaged. A released position would be provided for the lock nut by such cam sections for adjustment of the dial indicator and back plate unit about the axis of the swivel cylinder, and no threads would be needed on the cylinder.

It will be seen that the mounting assembly of the invention can readily be attached to a dial indicator or equivalent instrument by merely substituting the positioning means or assembly of the invention for the original back plate provided on the dial indicator. A dial indicator, when so positioned by use of the mounting assembly of the invention, will have additional adjustment action provided therefor so that the dial or face thereof can be turned or adjusted for convenient reading and gaging or indicating action. Thus it is believed that the objects of the invention have been achieved.

While two complete embodiments of the invention have been disclosed herein, it will be appreciated that modification of these particular embodiments of the invention may be resorted to without departing from the scope of the invention as defined in the appended claims.

What is claimed is:

1. A universal mounting assembly for a dial indicator or the like comprising a disc shaped cover plate having circumferentially spaced axially extending screw receiving apertures therein adapted to be secured to a dial indicator by screws received in said apertures, a swivel cylinder having a threaded section thereon extending parallel to the axis thereof and having a mounting lug extending from one end thereof, said mounting lug being adapted to engage a mounting member for movement of said swivel cylinder in one plane, said cover plate being rotatably positioned on said swivel cylinder for movement in a plane normal to the longitudinal axis of said swivel cylinder, means securing said cover plate to said swivel cylinder to prevent separation of such members in one direction, and a disc-type lock nut of substantially the same diameter as said cover plate engaging said threaded section of said swivel cylinder for movement to and from a locked position in which said cover plate is forced against said securing means to retain said cover plate in a fixed position, said lock nut having an axially extending bore therein adjacent the periphery thereof adapted to be aligned with any one of said apertures in said cover plate for access to said apertures and to pass screw means through said bore to any said aperture.

2. In a dial indicator and mounting means therefor including a case receiving and positioning dial indicator means therein and thereon, said case having an open back end, the combination comprising a swivel cylinder having a threaded section on its periphery extending parallel to the axis of the cylinder and having a mounting lug extending from one end thereof, said swivel cylinder also having a shoulder thereon facing said threaded section but intermediate said threaded section and said mounting lug, said swivel cylinder having a peripheral recess therein normal to its longitudinal axis adjacent its other end, a back plate for said case, means to engage said back plate and said case to secure said back plate thereto, said back plate being pivotally carried by said swivel cylinder intermediate said threaded section and said peripheral recess and being limited to rotary movement thereon, washer means engaging said peripheral recess to retain said back plate on said swivel cylinder, and a lock nut engaging said threaded section on said swivel cylinder, said lock nut being rotatable to force said back plate against said washer means to lock said back plate in a given position and to a release position in which said back plate can be rotated on said swivel cylinder.

3. In a dial indicator and mounting means therefor comprising a case receiving and positioning dial indicator means therein and thereon, said case having an open back end, the combination including a swivel cylinder having a threaded section on its periphery extending parallel to the axis of the cylinder and having a mounting lug extending from one end thereof, said swivel cylinder also having a shoulder thereon facing said threaded section but intermediate said threaded section and said mounting lug, said swivel cylinder having a peripheral recess therein normal to its longitudinal axis adjacent its other end, a back plate for the case, said back plate being pivotally carried by said swivel cylinder intermediate said threaded section and said peripheral recess, washer means engaging said peripheral recess to retain said back plate on said swivel cylinder, and a lock nut engaging said threaded section on said swivel cylinder, said lock nut being movable axially of said swivel cylinder to force said back plate against said washer means to lock said back plate in a given position, said nut being rotatable on said threaded section to a position abutting against said shoulder to provide a release position in which said back plate can be rotated on said swivel cylinder.

4. A universal mounting assembly for a dial indicator and the like including a cylinder, a plate slidably and rotatably mounted on the cylinder for movement along the axis thereof, means on one end of the cylinder for limiting axial movement of the plate thereon, a head on the other end of the cylinder, threads on the cylinder between the head and the plate, an adjustable nut mounted on the threads and exposed for movement against the plate at any time to lock it against the limiting means, means carried by the plate for securing it to the indicator, and a pierced lug extending integrally from the head end of the cylinder.

References Cited in the file of this patent

UNITED STATES PATENTS

| | | |
|---|---|---|
| 763,061 | Keil | June 21, 1904 |
| 1,328,125 | Camelinat | Jan. 13, 1920 |
| 2,456,003 | Knutson | Dec. 14, 1948 |
| 2,598,045 | Fox | May 27, 1952 |